United States Patent [19]

Mulaskey

[11] 4,382,023

[45] May 3, 1983

[54] CATALYZED COMBUSTION IN CRACKING CATALYST

[75] Inventor: Bernard F. Mulaskey, Fairfax, Calif.

[73] Assignee: Chevron Research Company, San Francisco, Calif.

[21] Appl. No.: 231,532

[22] Filed: Feb. 4, 1981

[51] Int. Cl.³ .......................... B01J 29/16; B01J 21/12
[52] U.S. Cl. ................................ 252/455 Z; 208/120; 423/244
[58] Field of Search .................... 252/455 Z; 208/120; 423/244 R

[56] References Cited

U.S. PATENT DOCUMENTS 4,241,033  12/1980  Ginger et al. .................... 423/244 R

FOREIGN PATENT DOCUMENTS 1499682  2/1978  United Kingdom ............ 252/455 Z

Primary Examiner—Carl F. Dees
Attorney, Agent, or Firm—D. A. Newell; S. R. LaPaglia; J. W. Ambrosius

[57] ABSTRACT

The volume ratio of $CO_2/CO$ in cracking catalyst regenerator flue gas is increased without adverse effect on cracking conversion and selectivity by employing a chromium oxidation catalyst at a high concentration in a small proportion of particles circulating in a cracking system.

3 Claims, No Drawings

CATALYZED COMBUSTION IN CRACKING CATALYST

CROSS-REFERENCE TO RELATED APPLICATIONS

This application is a continuation-in-part of my copending application Ser. No. 189,553, filed on Sept. 22, 1980 and now abandoned, which is, in turn, a division of my copending application Ser. No. 71,217, filed on Aug. 30, 1979 and now abandoned.

BACKGROUND OF THE INVENTION

The present invention relates to a process for converting hydrocarbons. More particularly, the invention relates to a catalytic hydrocarbon conversion process in which oxidation reactions occurring during catalyst regeneration are enhanced.

Catalytic cracking systems employ catalyst in a moving bed or a fluidized bed. Catalytic cracking is carried out in the absence of externally supplied molecular hydrogen, and is, therefore, distinctly different from hydrocracking, in which molecular hydrogen is added in processing. In catalytic cracking, an inventory of particulate catalyst is continuously cycled between a cracking reactor and a catalyst regenerator. In a fluidized catalytic cracking (FCC) system, hydrocarbon feed is contacted with catalyst particles in a hydrocarbon cracking zone, or reactor, at a temperature of about 425° to 600° C., usually 460° to 560° C. The reactions of hydrocarbons at the elevated operating temperature result in deposition of carbonaceous coke on the catalyst particles. The resulting fluid products are separated from the cokedeactivated, spent catalyst and are withdrawn from the reactor. The coked catalyst particles are stripped of volatiles, usually by means of steam, and passed to the catalyst regeneration zone. In the catalyst regenerator the coked catalyst is contacted with a predetermined amount of molecular oxygen. A desired portion of the coke is burned off the catalyst, restoring catalyst activity and simultaneously heating the catalyst to, e.g., 540° to 815° C., usually 590° to 730° C. Flue gas formed by combustion of coke in the catalyst regenerator may be treated for removal of particulates and conversion of carbon monoxide, after which it is normally discharged into the atmosphere.

The extent of conversion obtained in a cracking operation may be defined as the volume percent of feed hydrocarbons having a normal boiling point of at least 221° C. changed to hydrocarbon products having normal boiling points below 221° C. during the conversion step. Conversion is often used as a measure of the severity of a commercial cracking operation. At a given set of operating conditions, a more active catalyst gives a greater conversion than does a less active catalyst. High conversion allows flexible operation of an FCC unit. For example, when conversion is raised, feed throughput can be increased, or a higher degree of feed conversion can be maintained with a constant throughput rate.

The selectivity with which the feed is converted to desired hydrocarbon products is also important. The primary desired product is naphtha-boiling-range hydrocarbons, i.e., products which have a normal boiling point roughly between 24° C. and 220° C. Other possible conversion products are usually not as valuable as naphtha. For example, feed conversion may yield coke, hydrogen and such normally uneconomical by-products as the light paraffins, methane, ethane and propane. Formation of some coke is needed to provide process heat, but excessive coke formation at the expense of naphtha is undesirable. In contrast to light paraffins, the light olefins may be economically attractive products. For example, $C_2$-$C_4$ olefins can be utilized as feeds for other hydrocarbon conversion processes, such as alkylation of isobutane to form high-octane gasoline components, or for petrochemical-type operations such as polymerization.

The relatively recent impetus for eliminating octane-improving additives such as lead and manganese from commercial gasoline has increased the importance of improving the clear octane of the various components which make up the gasoline pool. Catalytically cracked naphtha is an important source of gasoline in the United States, but is often among the lower-octane components employed in the unleaded gasoline pool. FCC-derived naphtha may be upgraded by any of several conventional refining operations such as reforming, but the added expense of further refining can advantageously be avoided if octane ratings of FCC naphtha can be raised to an acceptable level by modifying the catalytic cracking operation itself.

Several patents have suggested modification of cracking catalysts to increase the octane rating of FCC naphtha. The modifications usually involve adding to the catalyst particles a metal or metal compound having a moderate dehydrogenation activity. For example, U.S. Pat. No. 3,835,032 suggests the use of silver-exchanged or copper-exchanged Type Y zeolite component in a cracking catalyst to increase the aromatic content of the naphtha product. U.S. Pat. No. 3,929,621 suggests the use of copper-exchanged Y zeolite as a catalyst component in order to increase aromatics and olefins in the cracked naphtha. U.S. Pat. No. 3,994,800 suggests using a modified Type Y zeolite to raise the olefins content of catalytically cracked naphtha. U.S. Pat. No. 3,788,977 suggests addition of alumina-supported uranium or platinum either as a component of cracking catalyst particles or in a particulate additive introduced into circulation in the particulate solids inventory in a cracking system to increase the dehydrogenation and cyclization reactions taking place in the cracking reactor.

Metals and metal compounds which have a substantial dehydrogenation activity generally also have a substantial activity for oxidation catalysis. The desire to promote efficient combustion of carbon monoxide during regeneration of cracking catalyst has led to the use of highly active metals as components in cracking catalysts. Some commercial cracking systems regenerate catalyst in an incomplete carbon monoxide combustion mode, in which a substantial amount of carbon typically remains on the catalyst after regeneration, e.g., more than 0.2 weight percent, usually about 0.25 to 0.45 weight percent residual carbon. The flue gas removed from cracking catalyst regenerators operating in an incomplete combustion mode is characterized by relatively low carbon dioxide/carbon monoxide volume ratio. The amount of oxygen introduced into a catalyst regenerator operating in an incomplete combustion mode must usually be carefully limited in order to prevent afterburning, or combustion of carbon monoxide in the flue gas downstream of the dense bed of catalyst, with consequent overheating of the flue gas.

Most fluidized catalytic cracking systems now use zeolite-containing catalysts. The zeolite catalysts have high activity and selectivity, particularly when the concentration of coke on the regenerated catalyst is relatively low. It is therefore desirable to have as little coke as possible on regenerated zeolite-containing catalysts to obtain the high activity and selectivity. It is often desirable to burn carbon monoxide as completely as possible during catalyst regeneration to obtain additional heat, especially when the concentration of coke on spent catalyst is low as a result of high catalyst selectivity. Among the ways previously suggested for reducing the amount of coke on regenerated catalyst and burning carbon monoxide for process heat is catalysis of complete combustion of carbon monoxide in a dense-phase catalyst bed in the regenerator by an active, combustion-promoting metal. For example, platinum has been used either as an integral component of the cracking catalyst particles or as a component of a separate particulate additive mixed with catalyst particles in the circulating particulate solids inventory. Various ways of employing carbon monoxide combustion-promoting metals in cracking systems have been suggested. In U.S. Pat. No. 2,647,860, it is proposed to add 0.1-1 weight percent chromic oxide to a cracking catalyst to promote combustion of carbon monoxide to carbon dioxide and thereby to prevent afterburning. In U.S. Pat. No. 3,808,121, it is proposed to introduce relatively large-size particles containing a carbon monoxide combustion-promoting metal into a cracking catalyst regenerator. The circulating particulate solids inventory, comprised of relatively small-size catalyst particles, is cycled between the cracking reactor and the catalyst regenerator, while the combustion-promoting particles remain in the regenerator because of their size. Oxidation-promoting metals such as cobalt, copper, nickel, manganese, copper-chromite, etc., disposed on an inorganic oxide such as alumina are disclosed. Belgian Patent Publication No. 820,181 suggests using catalyst particles containing platinum, palladium, iridium, rhodium, osmium, ruthenium or rhenium to promote carbon monoxide oxidation in a catalyst regenerator. The publication suggests addition of an amount of the metal between a trace and 100 ppm to the catalyst particles, either during catalyst manufacture or during the cracking operation, as by addition of a compound of the combustion-promoting metal to the hydrocarbon feed. The publication also teaches that addition of the promoter metal to the cracking system lowers product selectivity by substantially increasing coke and hydrogen formation. Catalyst particles containing the promoter metal can be used alone or circulated in physical mixture with catalyst particles free of the combustion-promoting metal. U.S. Pat. Nos. 4,072,600 and 4,093,535 discloses the use of combustion-promoting noble metals in cracking catalysts in concentrations of 0.01 to 50 ppm, based on total catalyst inventory.

It is recognized in the cracking art that metals which actively catalyze dehydrogenation and oxidation reactions can have serious drawbacks when used in cracking catalysts. The presence of such metals in a cracking catalyst can enhance formation of coke, hydrogen and light paraffin gases such as methane, as observed, for example, when processing hydrocarbon feeds which are high in nickel. The art has suggested several ways to obtain oxidation catalysis benefits by using active metals in a cracking catalyst without suffering a loss in product selectivity. In one approach, hydrocarbons are prevented from contacting the catalytic metal. Only the oxidation activity of the metal is utilized, since the metal is retained in the catalyst regenerator (e.g., U.S. Pat. No. 3,808,121) or is included within the crystals of a zeolitic crystalline aluminosilicate which has pore openings no larger than 5 Angstroms and small size (3-5 Angstrom) cages, so that essentially no feed or cracked hydrocarbons can contact the metal while it is in the reactor (e.g., U.S. Pat. No. 3,364,136). In another approach, the catalytic metal is employed on the catalyst at a concentration sufficiently low that the adverse effect on selectivity is small enough so that the selectivity loss caused by the presence of the metal can be economically offset by the benefits of increased heat due to complete carbon monoxide combustion and increased zeolite activity and selectivity due to low residual coke level.

U.S. Pat. No. 3,267,043 describes the preparation of a chromia-boria xerogel by reacting a chromium compound, boric acid and an epoxide in the presence of a solvent capable of dissolving the chromium compound to form a hydrogel, and dehydrating the hydrogel. The composition is suggested for use as a catalyst for dehydrogenation and isomerization of paraffins.

U.S. Pat. No. 4,071,436 describes the use of alumina particles containing 0.07 to 3.4 weight percent chromium to reduce the level of sulfur oxides in catalyst regenerator flue gas in a catalytic cracking system. The use of a low concentration (1 weight percent or less) of chromium in catalyst particles in order to enhance carbon monoxide combustion has been suggested in U.S. Pat. No. 2,647,860. This patent teaches that use of more than 1 weight percent chromium causes excessive coke formation selectivity loss. U.S. Pat. No. 4,093,535 shows results obtained using catalysts impregnated with 0.05 weight percent chromium, 0.2 weight percent chromium and 1 weight percent chromium in cracking and oxidation activity tests. This patent discloses that use of catalyst containing 1 weight percent chromium caused a severe loss in cracking activity and some loss in product selectivity while providing only a small increase in oxidation activity ($CO_2/CO$ ratio of 3.8) relative to catalyst without an oxidation promoter ($CO_2/CO$ ratio of 1.7). The prior art teachings as to chromium use indicate that chromium is generally believed to be only slightly effective for enhancing oxidation reactions during catalyst regeneration, and that use of catalyst containing 1 weight percent or more chromium results in severe loss of activity and selectivity in cracking.

Three U.S. Pat., Nos. 4,146,463, 4,153,534, and 4,153,535, allege that chromium can be used in low concentrations (10 ppm to 1 weight percent) in catalytic cracking systems to adsorb sulfur oxides in a catalyst regenerator, in order to reduce sulfur oxides emissions in catalyst regenerator flue gas.

SUMMARY OF THE INVENTION

In an embodiment, the present invention concerns a process for cracking hydrocarbons in the absence of externally supplied molecular hydrogen in a cracking system employing a circulating particulate solids inventory including cracking catalyst particles, the inventory being cycled between a cracking zone and a catalyst regeneration zone, wherein the hydrocarbons are cracked in contact with the catalyst particles and coke is formed on the catalyst particles at cracking conditions in the cracking zone, and flue gas containing carbon oxides is formed by burning coke off the catalyst particles with a molecular oxygen-containing gas at regeneration conditions in the regeneration zone, the present invention being directed to a method for increasing the volumetric ratio of carbon dioxide to carbon monoxide in the flue gas comprising: including in the particulate solids inventory from 0.05 to 5 weight percent of promoted particles selected from (1) particulate solids other than the catalyst particles, (2) a portion of the catalyst particles, and (3) a mixture of (1) and (2), the promoted particles including at least 10 weight percent chromium, calculated as elemental metal, and the concentration of chromium in the particulate solids inventory being from 0.01 to 3.5 weight percent, calculated as elemental metal.

In another embodiment, the invention concerns a composition of matter comprising a mixture of (a) from 95 to 99.95 weight percent of particles of an acidic cracking catalyst comprising silica and at least one other refractory inorganic oxide; and (b) from 0.05 to 5 weight percent of particles of an oxidation catalyst, the oxidation catalyst particles comprising greater than 10 weight percent chromium, calculated as elemental metal, the concentration of the chromium component in the composition of matter being between 0.01 and 3.5 weight percent, calculated as elemental metal.

DETAILED DESCRIPTION OF THE INVENTION

The present invention is preferably used in a system for catalytic cracking of hydrocarbon feeds. Conventional catalytic cracking feeds typically include a mixture of aliphatic, naphthenic and aromatic hydrocarbons boiling at 221° C. and higher. The same hydrocarbon cracking feeds normally processed in commercial catalytic cracking systems may be processed in a cracking system employing the present invention. Suitable feed stocks include, for example, petroleum distillates or residuals, either virgin or partially refined, as by catalytic hydroprocessing or the like. Thus, conventional gas oil cuts are suitable, as are atmospheric and vacuum residue. Socalled synthetic feeds, such as coal oils, bitumen and shale oils, and fractions thereof, are also suitable. A suitable feed may include recycled hydrocarbons which have already been subjected to cracking, for example, light, medium and heavy cycle oils. Suitable feeds may have been previously treated or refined to remove sulfur, nitrogen or metals, as by catalytic treatment in the presence of hydrogen.

Conversion, or cracking, conditions employed in the hydrocarbon conversion step of the invention may be obtained in part by preheating or heat-exchanging the hydrocarbon feed to bring it to a temperature of about 315° to 400° C. before introducing it into the cracking zone, but preheating of the feed is not essential. Cracking, conversion conditions include a temperature of about 425° to about 600° C., preferably 460° to 560° C. Cracking conditions also include a pressure in the range from about atmospheric to about 4 atmospheres or more, preferably about 2 atmospheres to about 3 atmospheres. In fluidized catalyst systems, a catalyst/hydrocarbon weight ratio of about 3 to about 10 is usually suitable. A hydrocarbon weight hourly space velocity in the cracking zone of about 5-250 per hour is preferably used. The average amount of coke contained in the so-called "spent" catalyst after contact with the hydrocarbons in the cracking zone, when the catalyst is passed to the regenerator, is preferably between about 0.5 weight percent and about 2.5 weight percent. The exact coke concentration on spent catalyst will depend partly on the desired carbon content of regenerated catalyst in the particular system, as well as on the heat balance of the particular system. The cracking, or reaction, zone may be of conventional design and may use dilute-phase fluidized catalyst contact, riser-type entrained catalyst contact, dense bed fluidized catalyst contact, countercurrent contact, or a combination thereof, between the feed hydrocarbons and the catalyst. Catalyst fluidization and entrainment may be assisted by use of gases such as steam or nitrogen.

The catalyst regeneration zone used in an embodiment of the present invention may also be of conventional design used in regenrating cracking catalyst. The gaseous atmosphere within the conventional cracking catalyst regeneration zone normally includes a mixture of gases in concentrations which vary according to the locus within the regenerator. The concentrations of gases also vary according to the coke concentration on the spent catalyst particles entering the regenerator and according to the amount of molecular oxygen and steam introduced into the regenerator. Generally, the gaseous atmosphere in the regenerator contains 5-25% steam, varying amounts of oxygen, carbon monoxide, carbon dioxide and nitrogen. The regenerator atmosphere also typically includes at least some undesirable gases such as sulfur oxides and nitrogen oxides. A temperature in the regeneration zone of about 538° to about 815° C. is generally suitable, and a temperature of about 600° to about 700° C. is preferred. Regeneration is preferably carried out primarily in a dense-phase fluidized bed of catalyst, with "dense-phase" being defined as a density of at least 160 kg/m$^3$.

When buring coke off the particulate solids in a cracking catalyst regenerator, it is preferred to take full advantage of the presence of the chromium component to achieve as complete oxidation as possible of coke and carbon monoxide. The completeness of coke combustion during catalyst regeneration can be characterized in terms of the concentration of coke on the regenerated catalyst. In the method of the invention, it is preferred to burn enough coke off the catalyst during regeneration to provide a coke concentration of not more than 0.2 weight percent, and particularly preferably not more than 0.05 weight percent, on regenerated catalyst particles. The completeness of carbon monoxide combustion during regeneration can be characterized in terms of the volumetric ratio of carbon dioxide to carbon monoxide in the flue gas removed from a cracking catalyst regenerator. In the present method, it is preferred to catalyze sufficient combustion of carbon monoxide in the cracking catalyst regenerator, using the chromium component, to provide a carbon dioxide/carbon monoxide volume ratio of at least 4 in flue gas removed from the regenerator. Particularly preferably, sufficient carbon monoxide is burned in the regenerator to provide a carbon dioxide/carbon monoxide ratio of at least 10 in the effluent gas.

In order to obtain the preferred relatively complete coke and carbon monoxide combustion, as indicated above, it is desirable to introduce molecular oxygen into the catalyst regenerator in an amount in excess of the stoichiometric combustion requirement for oxygen. The amount of excess oxygen used in regeneration can be characterized in terms of the oxygen content of flue gas removed from the catalyst regenerator. In carrying out the present process, enough molecular oxygen is preferably introduced into the regenerator to provide an oxygen concentration of at least 0.05 volume percent in the gaseous effluent from the regenerator and especially preferably at least 0.3 volume percent. The problem of carbon monoxide afterburning, often encountered when excess oxygen is used in conventional regeneration, can be obviated in carrying out the present invention by the presence in the regenerator of the chromium component. Because of the oxidation-catalyzing activity of the chromium, carbon monoxide can be burned rapidly in the presence of enough catalyst particles so that most of the heat of combustion of carbon monoxide can be absorbed in a relatively uniform manner into the catalyst particles with litte or no flue gas temperature increase from further combustion in the absence of catalyst particles.

According to the invention, particles containing chromium are included in the circulating inventory of particles in a hydrocarbon cracking system in order to increase the volume ratio of carbon dioxide to carbon monoxide in flue gas formed during regeneration of the cracking catalyst. It is essential that the chromium component is included in only a small proportion of the total inventory of circulating particles, because the presence of the chromium in the cracking system could otherwise result in a serious loss of selectivity as a result of an increase in hydrogen and coke formation. The presence of the chromium could also substantially reduce conversion of the feed if the chromium were widely distributed throughout the circulating inventory of particles. The present invention is, in part, directed to permitting the use of chromium as an oxidation catalyst in catalytic cracking systems without suffering the activity and selectivity losses during cracking step as encountered in prior art attempts to use chromium in cracking systems.

The chromium component may be included in particles which also contain a cracking component having a high intrinsic acidic cracking activity. More preferably, however, the chromium component is included in particles which do not contain a particularly active cracking component. For example, particles of a pure chromium compound can be employed in some cases, depending upon the attrition resistance of the chromia particles provided by a particular method of manufacture.

According to the invention, a catalytically-active amount of the chromium component is associated with not more than 5 weight percent of the total inventory of particulate material circulating in a hydrocarbon cracking system. The particulate solids inventory in the cracking system includes catalyst particles, and may also include other particles. For example, particles of alumina may be used for reducing the amount of sulfur oxides in the flue gas produced in the catalyst regenerator, as described in U.S. Pat. No. 4,071,436. In carrying out the present invention, the chromium component may be included in a small fraction of the catalyst particles or, more preferably, may be included in separate particles added in a small amount to the catalyst particles. It is particularly preferred that the chromium component is included at a catalytically-active concentration on not more than 1 weight percent of the total circulating particulate solids. Using the chromium component in concentrated form, present in not more than one percent of the total circulating solids, permits a relatively complete combustion of carbon monoxide, with little or no adverse effect on the activity and selectivity of the cracking reactions which take place in the reactor section of the cracking system.

It is essential that the chromium component is present in the chromium-promoted particles at a high, catalytically-active concentration. Using the chromium in concentrated form gives results surprisingly superior to the results which would be expected from the teachings of the prior art. The art has suggested that using chromium widely distributed and in a relatively large concentration, with reference to the total inventory of circulating solids, seriously reduces the hydrocarbon feed conversion and also reduces the selectivity of cracking conversion to desired products. The art also teaches that chromium rapidly loses its activity for oxidation catalysis. I have found that chromium used in particles having a chromium concentration of at least 10 weight percent and preferably at least 25 weight percent is strongly active as an oxidation catalyst and has a stability far superior to the catalytic stability which would be expected in view of the prior art. Simultaneously, also unexpectedly in view of the prior art, the chromium has little or no adverse effect on the activity and selectivity of conversion obtained in the cracking step. Thus, the amount of chromium in particles, calculated as elemental metal, should be at least 10 weight percent. Preferably, the chromium concentration is at least 25 weight percent in the metal-promoted particles.

The chromium component can be used alone, e.g., as the elemental metal, oxide, etc. The chromium component can also be composited with known catalyst bases such as refractory inorganic oxides, and with stabilizing materials. Although chromium (which is preferably employed in the form of chromia) is very active initially when used alone, I have found that certain stabilizing agents act to stabilize chromia against deactivation. Preferred stabilizing materials include tin, boron, copper, phosphorus and compounds thereof, such as oxides, sulfides, sulfates. etc. A stabilizer is composited with chromium at a stabilizer:chrome weight ratio of about 0.01:1 to about 1:1. Preferably, a stabilizer is used at a weight ratio between 0.1:1 and 1:1 with respect to chromium. Tin is a particularly preferred stabilizer. Weight ratios are calculated on an elemental basis.

While it is essential, in carrying out the invention, that particles containing chromium must contain at least 10 weight percent chromium and preferably 25 weight percent chromium, it is also essential that the overall concentration of chromium in the circulating inventory of particulate solids is maintained within a precise concentration range, and that the fraction of the particles in the inventory which contain a catalytically-effective concentration of chromium is also maintained within a precise range. If too little chromium is included in the system, relative to the total inventory of circulating solids, catalysis of carabon monoxide combustion will be hindered. On the other hand, if too great a concentration of chromium is included in the circulating solids, or too great a fraction of the circulating particulate solids inventory contains of catalytically-effective amount of chromium formation of gas (e.g., hydrogen and methane) and coke in the reactor section of the cracking system can become excessive, and conversion of hydrocarbons can also be adversely affected.

According to the present invention, a catalytically-effective concentration of chromium is included in a fraction of the circulating solids between about 0.05 weight percent and 5 weight percent of the circulating inventory of solids. Preferably, a catalytically-effective amount of chromium is included in not more than 1 weight precent of the circulating particulate solids. Further according to the invention, the total concentration of chromium in the circulating particulate solids inventory is kept between about 0.01 and 3.5 weight percent. Preferably, the total concentration of chromium is maintained within the range from greater than 1.0 to 3.5 weight percent, based on the circulating inventory of particulates. By maintaining the concentration of chromium at a catalytically-effective level relative to the total weight of circulating solids, while restricting chromium to a small weight fraction of the circulating solids, I have found it possible to obtain effective carbon monoxide combustion during catalyst regeneration while minimizing any adverse effect on the overall cracking conversion and selectivity in the cracking system. At the same time, using chromium in concentrated form in a small fraction of the solids provides a stable, long-lived combustion promoter.

Chromium, e.g., as chromia, may be formed or composited into particles of appropriate size by known techniques, such as spray-drying in the case of fluidized bed cracking operation or pelleting, pilling or the like in the case of a moving bed cracking operation. A compound of chromium may be incorporated with other materials, e.g., supports, by conventional combination procedures such as impregnation, cogellation, etc. A preferred method for preparing chromium-promoted particles includes dissolving a chromium compound, such as the nitrate, chloride, sulfate or the like, in a solvent such as water, alcohol or the like and then forming a hydrogel by reacting the solution with an epoxide, such as ethylene oxide, propylene oxide or epichlorohydrin. A hydrogel can also be formed using sodium hydroxide, ammonium hydroxide, or the like. The hydrogel is then dried and formed to the desired particle size, when alkoxide addition is used, or is spray-dried and washed in the case of inorganic basetype gellation. Cogels of chromia and stabilizing agents, such as tin, boron, phosphorus, copper, etc., can be formed in the same manner.

According to one aspect of the invention, a composition of matter is provided comprising a mixture of silica-containing, acidic cracking catalyst particles and the chromium-containing oxidation catalyst particles. The composition can be formed by mixing acidic cracking catalyst particles with 0.05 to 5 weight percent of oxidation catalyst particles, and thereafter employing the mixture in a catalytic cracking system. Alternatively, the mixture can be formed in situ in a hydrocarbon cracking system by separately introducing cracking catalyst and oxidation catalyst into the particulate solids inventory in appropriate relative amounts. The oxidation catalyst particles contain greater than 10 weight percent chromium and preferably greater than 25 weight percent chromium. The concentration of chromium in the total mixture of acidic cracking catalyst and oxidation catalyst should be between 0.01 and 3.5 weight percent and is preferably from greater than 1 to 3.5 weight percent.

The cracking catalyst employed in the composition may, for example, be a conventional particulate, nonzeolitic or zeolitic cracking catalyst including silica. The acidic cracking catalyst used in the composition of the invention contains at least one active, acidic cracking component selected from the group consisting of silica-containing zeolitic crystalline aluminosilicates, silica-containing, nonzeolitic, crystalline, refractory inorganic oxides and silica-containing, amorphous, refractory inorganic oxides. The acidic cracking catalyst should include at least 10 weight percent silica and preferably includes at least 20 weight percent silica. Examples of suitable acidic crystalline catalyst materials are natural and synthetic clays, acid-treated clays and the like. Examples of suitable amorphous materials are amorphous, natural or synthetic silica-alumina, silica-magnesia, silica-alumina-magnesia, silica-zirconia, etc. Acidic, nonzeolitic, refractory inorganic oxides containing silica and alumina are preferred acidic components of the nonzeolitic catalyst materials. Suitable materials also include kaolin clays, silica-containing gels and cogels, etc. Refractory inorganic oxides may include one or more of alumina, magnesia, zirconia, thoria, titania and the like. Those skilled in the art will be familiar with a large number of suitable nonzeolitic, acidic catalysts and catalyst components, as such catalysts were the predominant type used in catalytic cracking operations prior to introduction of zeolitic catalysts.

Zeolitic cracking catalysts suitable for use in the present composition are those containing a crystalline aluminosilicate zeolite as an active, acidic cracking component. Crystalline aluminosilicate zeolites have a regular, three-dimensional crystal structure defining pores, channels and/or cells having molecular dimensions. They are commonly referred to as molecular sieves. Zeolitic catalysts are very highly acidic, and have a substantially higher cracking activity than, for example, amorphous silica-alumina catalysts. The acidity and activity of a cracking catalyst can be measured by any of several tests known to those skilled in the art. Activity tests are described or referenced in U.S. Pat. Nos. 4,010,116, 3,957,689, 3,976,598, 3,816,342 and 3,048,536, the complete disclosures of which are incorporated herein by specific reference.

The use of acidic, zeolitic crystalline aluminosilicates, or molecular sieves, as the primary, active components in cracking catalysts is well known. Most present commercial zeolite-type catalysts contain a molecular sieve of the faujasite crystal structure. Zeolite Y-type molecular sieves are especially favored for use in cracking catalysts. In manufacturing zeolite cracking catalysts, the zeolite component, as synthesized, is subjected to ion-exchange in order to activate and stabilize the zeolite prior to its catalytic use. This ion-exchange procedure typically substitutes protons, proton precursors such as ammonium, or rare earth cations for the sodium or potassium cations normally present in the zeolite as synthesized. The X-type and Y-type zeolites used commonly for cracking catalysts have a faujasite-type crystal structure and have a silica/alumina molar ratio of about 3 to 5. Other zeolites, such as mordenite and ZSM-5-type crystalline aluminosilicates, which have different characteristic crystal structure and have silica/alumina molar ratios above 6, have also been proposed for use in cracking catalysts and are suitable as components of acidic cracking catalysts employed in the present method. In commercial cracking catalysts, the zeolite component is normally composited or synthesized in association with a matrix or binder precursor such as clay or a silica-alumina hydrogel, which facilitates shaping the final catalyst. The matrix material may or may not have some catalytic cracking activity of its own.

EXAMPLE 1

A chromia oxidation catalyst was prepared by a preferred method as follows. 53.2 grams of $CrCl_3.6H_2O$ (0.2 mol) were dissolved in 120 ml of anhydrous methanol as a solvent. The solution was cooled to 10° C. Propylene oxide was then mixed with the solution in the amount of 70 ml, and a hydrogel formed. The hydrogel was allowed to stand for 12 hours and dried to a xerogel by evaporation. The xerogel was further dehydrated by heating at 105° C. for 12 hours in a partial vacuum. The xerogel was then crushed and sized to particles of 100-325 mesh. The resulting composite was designated Catalyst A.

EXAMPLE II (a) A chromia oxidation catalyst stabilized with tin oxide was prepared by a preferred method as follows. 26.6 grams of $CrCl_3.6H_2O$ (0.1 mol) were dissolved in 70 ml of anhydrous methanol, which acted as a solvent. 22.8 grams (0.1 mol) of $SnCl_3$ were dissolved in 50 ml of anhydrous methanol, and the two solutions were mixed. The resulting solution was cooled to 10° C. 70 ml of propylene oxide were then added to the mixed solution, and a hydrogel formed. The hydrogel was dried by evaporation for 12 hours followed by dehydration at 105° C. in a partial vacuum. The resulting xerogel was then crushed and sized to 100-325 mesh and designated Catalyst B.

(b) A chromia oxidation catalyst stabilized with boria was prepared by a preferred method as follows. 54 grams of $CrCl_3.6H_2O$ (0.2 mol) were dissolved in 300 ml of anhydrous methanol. 10 grams of $H_3BO_3$ (0.16 mol) were then added to the solution and dissolved. 70 ml of propylene oxide were then added with stirring for 3 hours and a hydrogel formed. The hydrogel was dried to a xerogel by 12 hours evaporation. The xerogel was further dehydrated in a partial vacuum at 250° C. for 8 hours. The resulting material was crushed and sized at 100-325 mesh and designated Catalyst C.

(c) A chromia oxidation catalyst stabilized with copper was prepared in the same manner as Catalysts B and C, using equimolar proportions of Cr and Cu. The resulting catalyst was designated Catalyst D.

(d) A chromia oxidation catalyst stabilized with phosphorus was prepared in the same manner as Catalysts B-D using a 2:1 Cr:P molar ratio. The resulting material was sized at 100-325 mesh and designated Catalyst E.

EXAMPLE III

Catalysts A-E were tested for oxidation catalytic activity. In each test, enough oxidation catalyst was mixed with 2 grams of spent equilibrium zeolitic FCC catalyst of a type commercially available so that the mixture contained 1 weight percent oxidation catalyst. A control test was also performed using the spent FCC catalyst without any oxidation catalyst. In each test the mixture was heated in a stream of air or 21 volume % oxygen in argon at 1000° to 1300° F. for about 8 minutes. The effluent gas was collected and analyzed to determine the $CO_2/CO$ volume ratio. The results of each test are shown in Table I.

TABLE I

| 1% Promoted Particles in Cracking Catalyst | | |
|---|---|---|
| Oxidation Promotor | Stabilizer in Promoted Particles | $CO_2/CO$ Ratio |
| A | None | 236 |
| B | Tin | 31.5 |
| C | Boron | 31.2 |
| D | Copper | 601 |
| E | Phosphorus | 14 |
| None | — | 1 |

EXAMPLE IV

Samples of microgel-type chromium combustion promoters in accordance with the present invention were compared with a cracking catalyst impregnated with chromium in a cyclic aging test to simulate the deactivation which occurs in a catalytic cracking system when the combustion promoter is subjected to repeated cracking and regeneration cycles. The microgel samples were prepared in the same manner as those described in Examples I and II. The promoters were mixed with samples of the cracking catalyst in amounts sufficient to give 1 weight percent of the promoter. The impregnated chromium sample was prepared by impregnating a sample of the cracking catalyst, a commercial, zeolite-type cracking catalyst, with sufficient chromium nitrate to provide 1 weight percent chromia upon calcination. Each sample was cyclically contacted with a hydrogen feed at a temperature of 915° F. and then heated in air at 1165° F. The flue gas from the air heating step was analyzed to determine its $CO_2/CO$ volume ratio. The results are shown in Table II. $CO_2/CO$ ratios are shown for (1) initial operation and (2) after 24 hours of cycling. The time required to deactivate to a $CO_2/CO$ ratio of 4:1 is also shown. It can be seen from the data in Table II that chromium impregnated on a cracking catalyst performed rather poorly, as it had an initial $CO_2/CO$ ratio of 14 and deactivated to a ratio of 4 in only 8 hours. Chromia microgel particles without a promoter had an initial $CO_2/CO$ ratio of 30, and required 60 hours of cycling before the $CO_2$/ratio decreased to 4. Thus, it can be seen that the separate particles of chromium oxidation promoter are surprisingly superior in both activity and stability in comparison to an identical amount of chromium impregnated on the whole sample of cracking catalyst.

TABLE II

| Cyclic Aging of Combustion Promotors | | | |
|---|---|---|---|
| | $CO_2/CO$ Ratio | | Hrs. Required |
| Sample | Initial | After 24 Hrs. | To Decrease To $CO_2/CO = 4$ |
| Cracking Catalyst Impregnated With 1 Wt. % Chromia | 14 | 2.5 | 8 |
| 1 Wt. % Chromia Microgel Mixed With Cracking Catalyst | 30 | 8.2 | 60 |
| 1 Wt. % Chromia-Tin Oxide (1:1 molar Cr:Sn) Microgel Mixed With Catalyst | 13 | 6.5 | >100 |
| 1 Wt. % Chromia-Copper Oxide (1:1 molar Cr:Cu) Microgel Mixed With Catalyst Particles | 50 | 5.2 | 34 |
| Cracking Catalyst Alone | <2 | <2 | — |

ILLUSTRATIVE EMBODIMENT I

A process according to the invention is carried out in a conventional FCC system, using commercially available zeolite cracking catalyst. The hydrocarbon feed is a conventional gas oil boiling in the 329° to 426° C. range. Cracking conditions employed include an average temperature of about 491° C., a pressure of about 2 atmospheres, a catalyst/oil weight ratio of about 10/1 and a contact time of about 5 seconds. According to the invention, particles of chromium oxidation promoter are introduced into the circulating particulate solids inventory. The oxidation catalyst particles are made entirely of chromia. Enough of the chromia particles are introduced so that the oxidation catalyst particles constitute 1 weight percent of the circulating particulate solids inventory in the FCC system. Regeneration conditions include a dense bed temperature of about 670° C. and 2 atmospheres pressure. Regenerated catalyst contains less than 0.1 weight percent carbon. The flue gas produced in the catalyst regenerator is analyzed and is found to contain about 0.5 weight percent molecular oxygen and is found to have an initial $CO_2/CO$ volume ratio of about 30, indicating substantial conversion of CO to $CO_2$.

ILLUSTRATIVE EMBODIMENT II

The FCC system described in Illustrative Embodiment I is employed using the same feed and cracking conditions. According to the invention, particles of a chromium oxidation catalyst stabilized with tin are used. The oxidation catalyst particles contain a 1:1 molar ratio of Cr:Sn as chromia and tin oxide. A sufficient amount of the oxidation particles is added to the circulating solids in the cracking system to constitute 1 weight percent of the inventory of circulating solids. Regeneration conditions include a dense bed temperature of about 670° C. and 2 atmosphere pressure. Regenerated catalyst contains less than 0.1 weight percent carbon. Flue gas removed from the regenerator includes 0.5 volume percent molecular oxygen and is found to have an initial $CO_2/CO$ volume ratio of about 13, indicating substantial conversion of CO to $CO_2$. The stability of the combustion promotion activity of the tin-modified oxidation catalyst is noticeably higher than that of an unpromoted chromia oxidation catalyst.

What is claimed is:

1. A composition of matter comprising a mixture of
   (a) from 95 to 99.55 weight percent of particles of an acidic cracking catalyst comprising silica and at least one other refractory inorganic oxide; and
   (b) from 0.05 to 5 weight percent of particles of an oxidation-promoting catalyst which includes greater than 10 weight percent chromium calculated as elemental metal and from 0.01 to 1 part, by weight, of tin for each part of chromium present, and further the concentration of chromium in the entire composition of matter being between 0.01 and 3.5 weight percent, calculated as elemental metal.

2. A composition of matter according to claim 1 wherein said particles of oxidation catalyst are formed by (a) forming a gel by mixing a liquid solution of a chromium compound with an epoxide, and (b) shaping and drying the gel.

3. A composition of matter according to claim 1 wherein the concentration of chromium in said composition of matter is from greater than 1 to 3.5 weight percent, calculated as elemental metal.

* * * * *

UNITED STATES PATENT AND TRADEMARK OFFICE
CERTIFICATE OF CORRECTION

PATENT NO. : 4,382,023
DATED : May 3, 1983
INVENTOR(S) : Bernard F. Mulaskey

It is certified that error appears in the above-identified patent and that said Letters Patent is hereby corrected as shown below:

Col. 5, line 40, "residue" should read --residua--

Col. 5, line 40, "Socalled" should read --So-called--

Col. 6, line 13, "regenrating" should read --regenerating--

Col. 6, line 33, "buring" should read --burning--

Col. 7, line 12, "litte" should read --little--

Col. 8, line 51, "carabon" should read --carbon--

Col. 9, Line 34, "basetype" should read --base-type--

Col. 12, line 19 "hydrogen" should read --hydrocarbon--

Col. 12, line 31, "CO2/ratio" should read --CO2/CO ratio--

Signed and Sealed this

Ninth Day of August 1983

[SEAL]

Attest:

GERALD J. MOSSINGHOFF

Attesting Officer    Commissioner of Patents and Trademarks